US012689054B2

(12) United States Patent
Choi et al.

(10) Patent No.: US 12,689,054 B2
(45) Date of Patent: Jul. 21, 2026

(54) WINDING APPARATUS AND WINDING METHOD FOR ELECTRODE CONNECTION FILM AND ELECTRODE ROLL

(71) Applicant: LG Energy Solution, Ltd., Seoul (KR)

(72) Inventors: In Chan Choi, Daejeon (KR); Sang Eun Jun, Daejeon (KR); Jin Ki Han, Daejeon (KR); Seung Jae Won, Daejeon (KR); Yong Jin Kim, Daejeon (KR); Jae Kwang Jung, Daejeon (KR); Sae Eun Lee, Daejeon (KR); Jun Kyu Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 498 days.

(21) Appl. No.: 18/284,761

(22) PCT Filed: Feb. 8, 2023

(86) PCT No.: PCT/KR2023/001848

§ 371 (c)(1),
(2) Date: Sep. 28, 2023

(87) PCT Pub. No.: WO2023/153802

PCT Pub. Date: Aug. 17, 2023

(65) Prior Publication Data

US 2024/0162472 A1    May 16, 2024

(30) Foreign Application Priority Data

Feb. 14, 2022    (KR) ......................... 10-2022-0019068
Feb. 1, 2023    (KR) ......................... 10-2023-0013851

(51) Int. Cl.
*H01M 10/04*        (2006.01)
(52) U.S. Cl.
CPC ... *H01M 10/0409* (2013.01); *H01M 10/0431* (2013.01)

(58) Field of Classification Search
CPC ...................... H01M 10/0409; H01M 10/0431
See application file for complete search history.

(56) References Cited

U.S. PATENT DOCUMENTS

2013/0074447 A1    3/2013 Kim et al.
2015/0200416 A1*    7/2015 Ajima ................. H01M 4/0435
                                                                    429/94

(Continued)

FOREIGN PATENT DOCUMENTS

CN        201201815 Y        3/2009
CN        109155424 A        1/2019

(Continued)

OTHER PUBLICATIONS

International Search Report for Application No. PCT/KR2023/001848 mailed May 26, 2023. 3 pages.

(Continued)

*Primary Examiner* — Mayla Gonzalez Ramos
(74) *Attorney, Agent, or Firm* — Lerner David LLP

(57)        ABSTRACT

A bobbin installation unit includes a bobbin, a film supply unit configured to supply an electrode-connecting film to the bobbin, a transfer unit configured to transfer the electrode-connecting film installed in the film supply unit to the bobbin installation unit, an adhesive tape attaching unit installed above the bobbin installation unit and configured to attach an end portion of the electrode-connecting film drawn out to the transfer unit to the bobbin. It also includes a double-sided tape attaching unit configured to attach a double-sided tape to the electrode-connecting film wound on the bobbin, and a frame body on which the adhesive tape attaching unit and the double-sided tape attaching unit are movably installed.

15 Claims, 7 Drawing Sheets

(56) References Cited

U.S. PATENT DOCUMENTS

| | | |
|---|---|---|
| 2017/0244083 A1 | 8/2017 | Yashiki |
| 2019/0067683 A1 | 2/2019 | Sato et al. |
| 2019/0131659 A1 | 5/2019 | Nam |
| 2023/0150784 A1 | 5/2023 | Lee et al. |

FOREIGN PATENT DOCUMENTS

| | | |
|---|---|---|
| JP | H09063565 A | 3/1997 |
| JP | 2002179304 A | 6/2002 |
| JP | 2017152214 A | 8/2017 |
| JP | 2017195207 A | 10/2017 |
| KR | 100353139 B1 | 9/2002 |
| KR | 20030006237 A | 1/2003 |
| KR | 100683173 B1 | 2/2007 |
| KR | 20110062462 A | 6/2011 |
| KR | 20130033143 A | 4/2013 |
| KR | 20140137836 A | 12/2014 |
| KR | 20150029544 A | 3/2015 |
| KR | 101617954 B1 | 5/2016 |
| KR | 101649730 B1 | 8/2016 |
| KR | 102080499 B1 | 2/2020 |
| KR | 102091577 B1 | 3/2020 |
| KR | 20200066018 A | 6/2020 |
| KR | 20210025142 A | 3/2021 |
| KR | 20210029448 A | 3/2021 |
| KR | 102323112 B1 | 11/2021 |
| KR | 20220008631 A | 1/2022 |
| WO | 2008041790 A1 | 4/2008 |

OTHER PUBLICATIONS

Search Report dated Jul. 27, 2025 from the Office Action for Chinese Application No. 202380010912.4 issued Jul. 30, 2025, pp. 1-2.
Extended European Search Report including Written Opinion for Application No. 23753150.4 dated Oct. 8, 2024, pp. 1-6.

* cited by examiner

[Fig. 1]
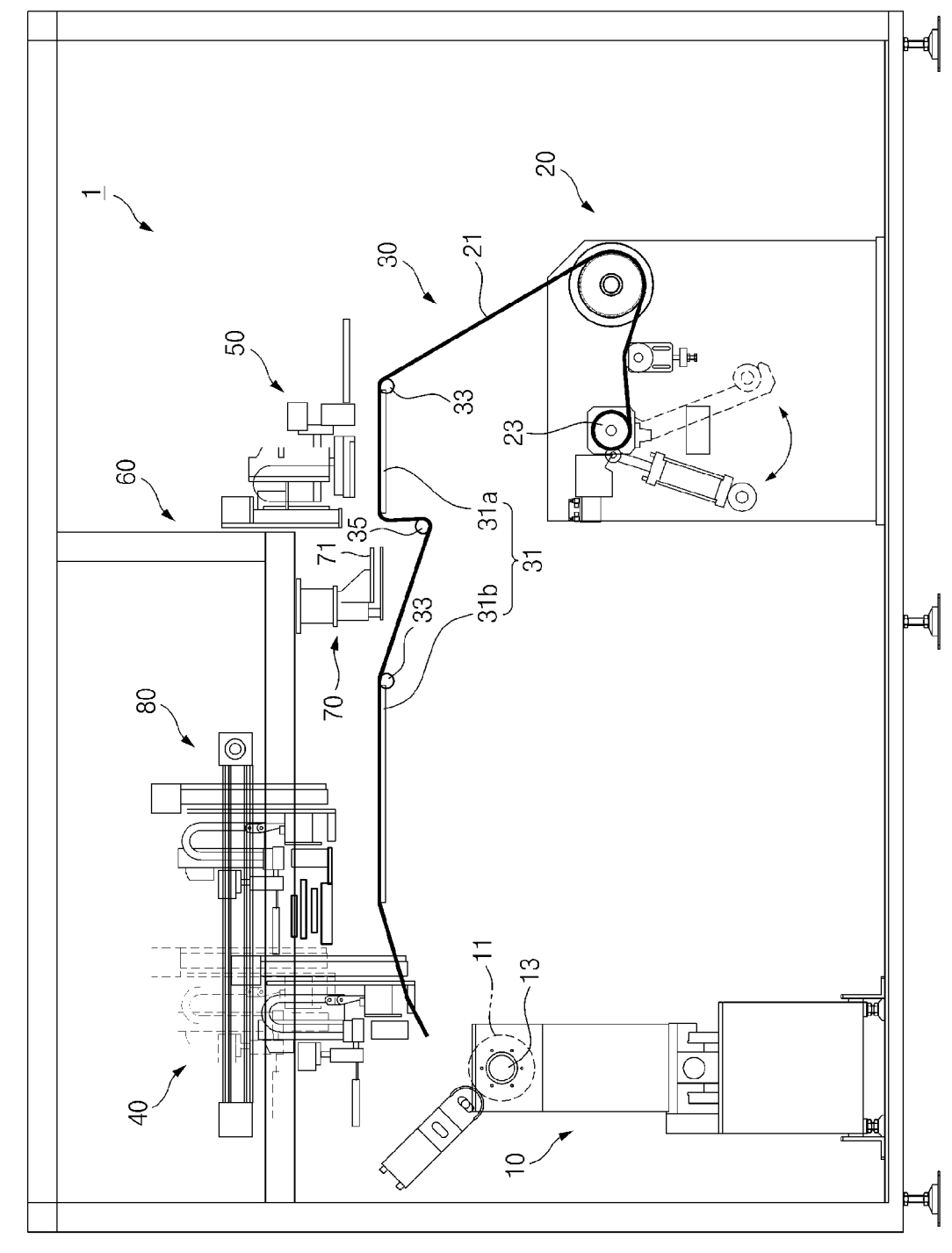

【Fig. 2】
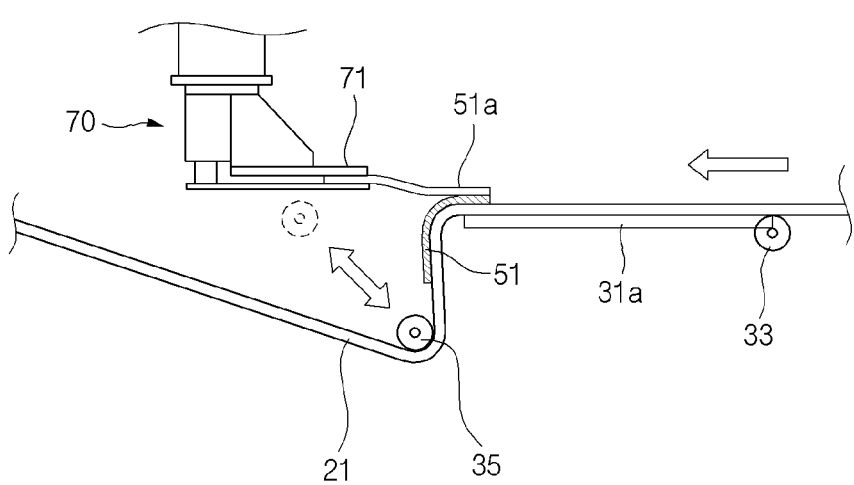

【Fig. 3】
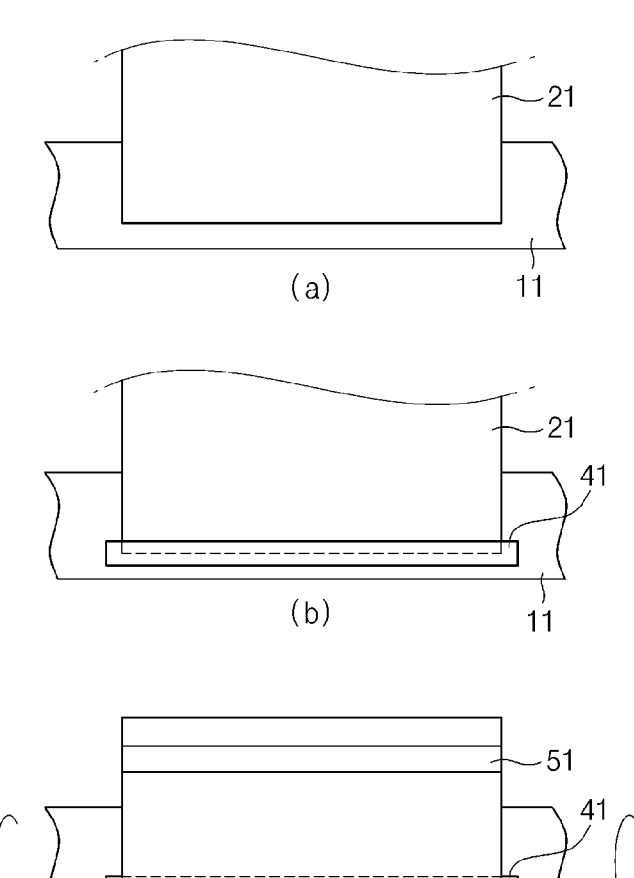
(a)
(b)
(c)
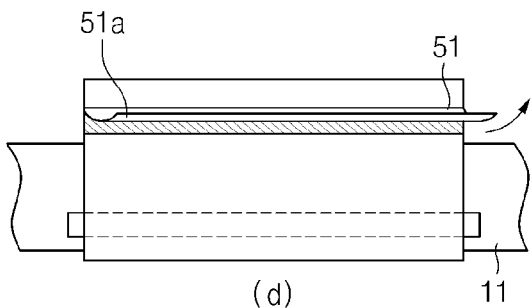
(d)

【Fig. 4】
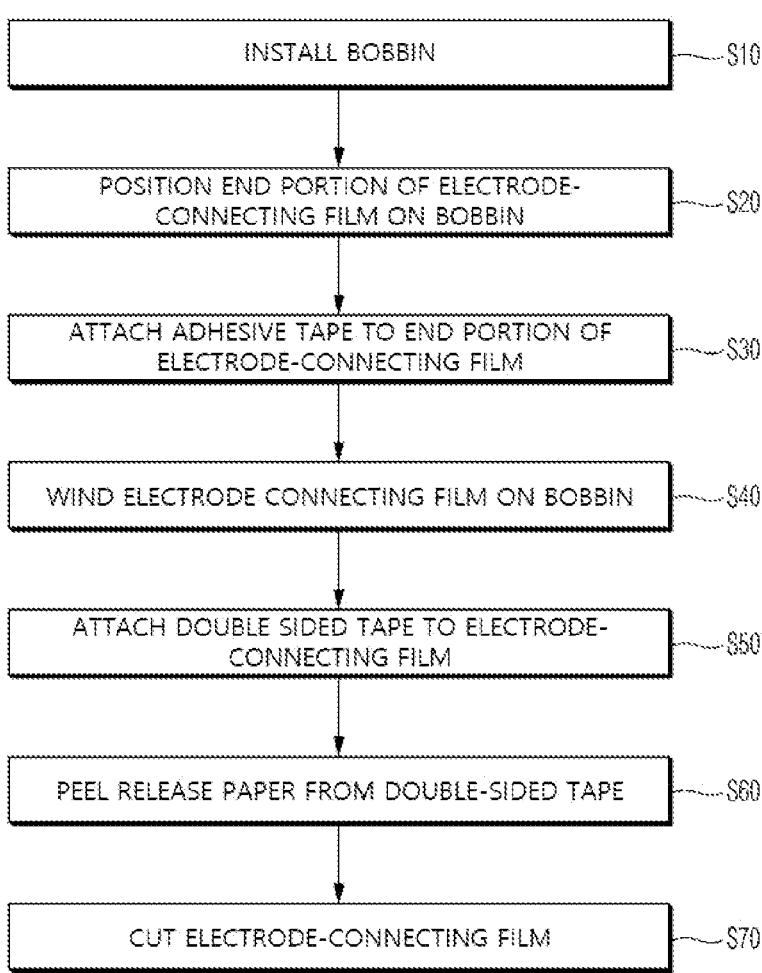

[Fig. 5]

【Fig. 6】
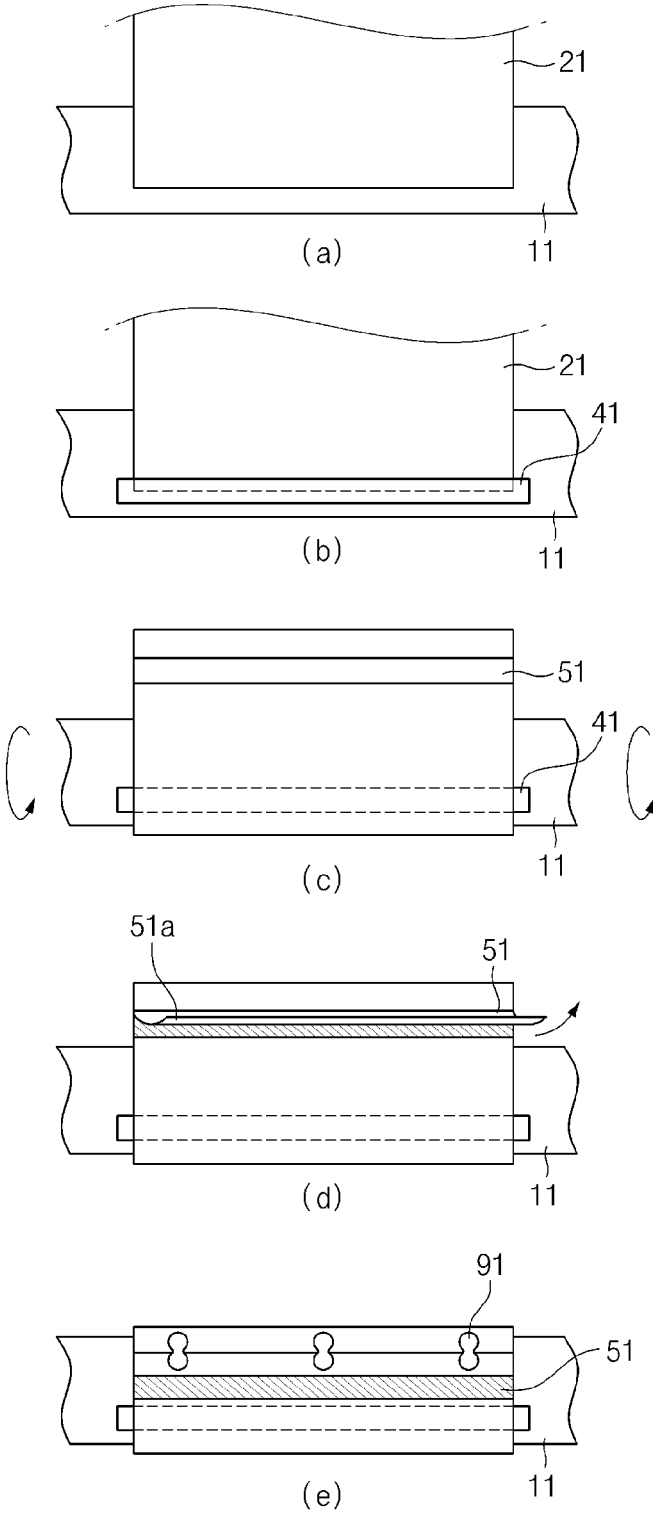

【Fig. 7】
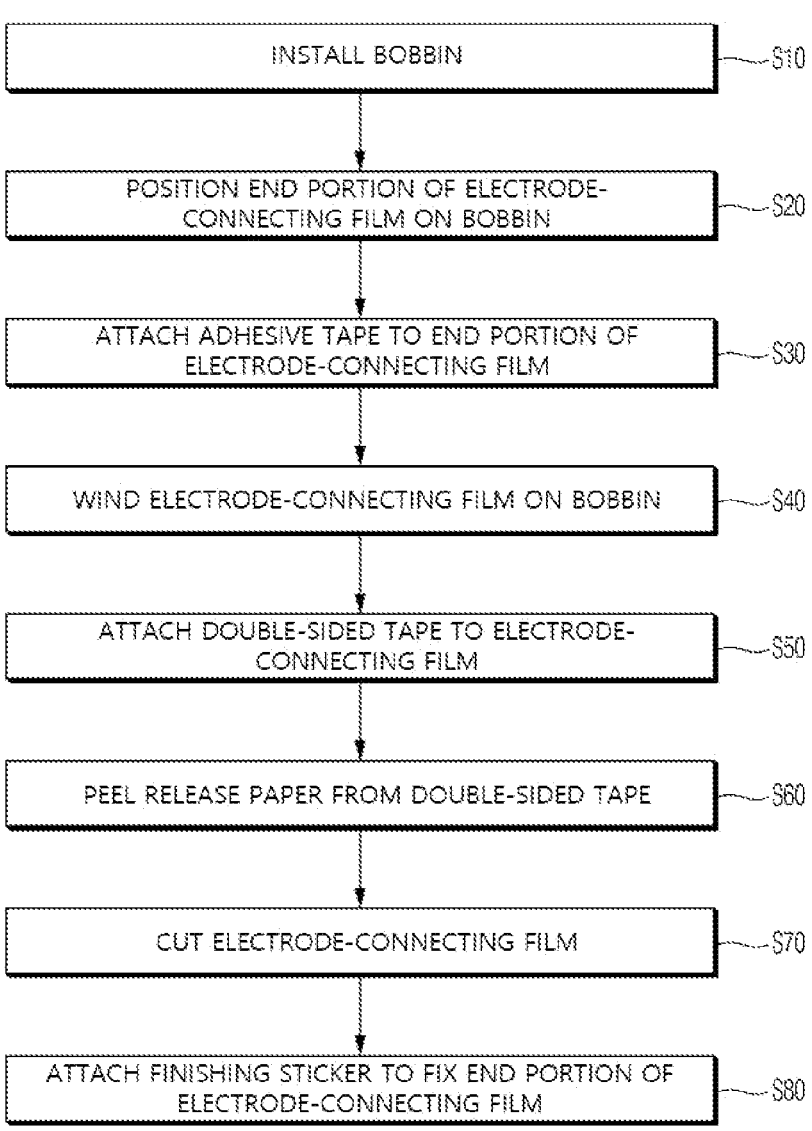

WINDING APPARATUS AND WINDING METHOD FOR ELECTRODE CONNECTION FILM AND ELECTRODE ROLL

CROSS-REFERENCE TO RELATED APPLICATIONS

This application is a national phase entry under 35 U.S.C. § 371 of International Application No. PCT/KR2023/001848 filed on Feb. 8, 2023, which claims priority from Korean Patent Application No. 10-2022-0019068 filed on Feb. 14, 2022 and Korean Patent Application No. 10-2023-0013851 filed on Feb. 1, 2023, all of which are incorporated by reference herein.

TECHNICAL FIELD

The present invention relates to an electrode-connecting film winding device for improving electrode loss.

More particularly, an aspect of the present invention relates to an electrode-connecting film winding device, capable of minimizing electrode loss that occurs when connecting electrodes between roll-to-roll processes by installing and winding an electrode-connecting film on an empty bobbin and allowing the electrode to be connected to the electrode-connecting film.

In addition, an aspect of the present invention relates to a method of winding an electrode-connecting film for improving electrode loss.

In addition, an aspect of the present invention relates to an electrode roll having an electrode-connecting film.

BACKGROUND ART

Recently, secondary batteries capable of charging and discharging have been widely used as an energy source of wireless mobile devices.

In addition, the secondary batteries have attracted attention not only as energy sources of portable devices such as mobile phones, laptop computers, and camcorders, but also as energy sources of electric vehicles, hybrid electric vehicles, and the like, which are proposed as a solution for air pollution of existing gasoline vehicles and diesel vehicles using fossil fuel.

Accordingly, the types of applications using the secondary batteries are becoming very diverse due to the advantages of the secondary batteries, and it is expected that the secondary batteries will be applied to more fields and products than now in the future.

Such secondary batteries may be classified into lithium-ion batteries, lithium-ion polymer batteries, lithium polymer batteries, and the like depending on the composition of the electrode and the electrolyte, and the amount of use of lithium-ion polymer batteries that are less likely to leak electrolyte and are easy to manufacture is on the increase.

In general, secondary batteries are classified into cylindrical batteries and prismatic batteries in which an electrode assembly is embedded in a cylindrical or prismatic metal can, depending on the shape of a battery case, and pouch-type batteries in which the electrode assembly is embedded in a pouch-type case of an aluminum laminate sheet.

In addition, the electrode assembly embedded in the battery case is composed of a positive electrode, a negative electrode, and a separator interposed between the positive electrode and the negative electrode, and is a power generating element capable of charging and discharging. The electrode assembly is classified into a jelly-roll type wound with a separator interposed between a positive electrode and a negative electrode which are long sheet-shaped and are coated with active materials, and a stack type in which a plurality of positive electrodes and negative electrodes of a predetermined size are sequentially stacked while a separator is interposed therebetween.

Here, the electric vehicles or the like require a plurality of battery modules because high-power electric energy is used, and these battery modules have a plurality of battery cells connected in series or parallel therein.

Meanwhile, electrodes completed by an electrode coating process may be wound on empty bobbins and sequentially transferred to subsequent processes such as a roll press process, a slitter process, and the like.

When an electrode roll (jumbo roll) is manufactured by winding an electrode on a bobbin, a double-sided tape is first wound and attached to an empty bobbin. Next, an adhesive tape (e.g., an oriented polypropylene (OPP) tape) is attached onto the double-sided tape wound on the bobbin. For the adhesive tape, pre-work is carried out directly on the empty bobbin by the operator's manual work, such that an adhesive surface is exposed facing the electrode to be wound while a non-adhesive surface is attached facing the double-sided tape.

In this way, the electrode roll is manufactured by attaching and winding one end of the electrode to the adhesive surface of the adhesive tape on which the pre-work is performed.

As described above, the electrode roll is conventionally manufactured by winding the double-sided tape on the bobbin, attaching the adhesive tape to the double-sided tape, and attaching the electrode to the adhesive side of the adhesive tape.

Such an electrode roll is mounted on an unwinder of a roll press device for subsequent operations (e.g., a roll press operation). An end portion of the electrode roll is unwound toward the rewinder and roll-to-roll processed between the unwinder and the rewinder. In this process, a predetermined operation (e.g., a roll pressing operation) is performed. A splicing operation, which connects an end portion of a new electrode roll to the end portion of the electrode of the almost completely used electrode roll, is performed when the electrode roll on the unwinder is almost completely unwound.

The electrode roll with few electrodes left to work on is called an old roll, and the newly input electrode roll is called a new roll, the new and old rolls are automatically spliced.

At this time, the old roll and/or the new roll are rotated so that the electrode of the old roll and the electrode of the new roll are automatically spliced. The roll press operation continues for the electrode on the new roll, which is automatically spliced, and the electrode that is cut off after splicing and remains on the old roll is discarded.

Here, an end portion of the electrode of the old roll will not be used because it is attached to the adhesive tape on the bobbin, and this causes electrode loss as much as the portion attached to the adhesive tape and the cut section.

In addition, since the pre-work is manually performed, there is a problem in that work efficiency is reduced and safety accidents may occur.

DISCLOSURE

Technical Problem

An aspect of the present invention has been made to solve at least some of the above problems. For example, an aspect of the present invention is directed to providing an elec-trode-connecting film winding device and an electrode-connecting film winding method, capable of minimizing electrode loss generated when connecting electrodes in a roll press process by installing an electrode-connecting film on a bobbin and then connecting the electrode to the electrode-connecting film, and winding the electrode.

Further, an aspect of the present invention is directed to providing an electrode-connecting film winding device and winding method, capable of preventing electrode loss and quality defects by replacing an electrode loss portion with an electrode-connecting film.

Further, an aspect of the present invention is directed to providing an electrode roll having a structure capable of connecting an electrode of a new roll and an electrode of an old roll to prevent electrode loss.

Technical Solution

In order to achieve the above objects, an aspect of the present invention includes a bobbin installation unit in which a bobbin is installed, a film supply unit configured to supply an electrode-connecting film to the bobbin, a transfer unit configured to transfer the electrode-connecting film installed in the film supply unit to the bobbin installation unit, an adhesive tape attaching unit installed above the bobbin installation unit and configured to attach an end portion of the electrode-connecting film drawn out of the transfer unit to the bobbin, a double-sided tape attaching unit configured to attach a double-sided tape to the electrode-connecting film wound on the bobbin, and a frame body on which the adhesive tape attaching unit and the double-sided tape attaching unit are movably installed.

The bobbin installation unit may include a winder con-figured to wind the electrode-connecting film by rotating the bobbin and a chucking member configured to fix the bobbin installed in the winder.

The adhesive tape attaching unit may be installed to be horizontally movable in a width direction of the bobbin, and the adhesive tape attaching unit may fix the electrode-connecting film on the bobbin by attaching an adhesive tape to the end portion of the electrode-connecting film while moving in the width direction of the bobbin.

The electrode-connecting film winding device may include a cutting unit connected to the adhesive tape attach-ing unit and configured to cut the electrode-connecting film to which the double-sided tape is attached by the double-sided tape attaching unit.

The electrode-connecting film winding device may include a finishing sticker attaching unit provided below the cutting unit and configured to fix the electrode-connecting film by attaching a finishing sticker to the cut end portion of the electrode-connecting film.

The double-sided tape attaching unit may be installed above the transfer unit to be vertically movable.

The electrode-connecting film winding device may include a release paper peeling unit configured to peel a release paper from the double-sided tape attached to the electrode-connecting film.

The transfer unit may include one or more base plates configured to support the electrode-connecting film being transferred, one or more driving rollers configured to trans-fer the electrode-connecting film, and a moving roller mov-ably installed to maintain the tension of the electrode-connecting film being transferred.

According to an aspect of the present invention, there is provided, a method of winding an electrode-connecting film, the method including introducing and installing a bobbin, positioning an end portion of an electrode-connecting film on the bobbin, fixing the electrode-connecting film to the bobbin by attaching an adhesive tape to the end portion of the electrode-connecting film, winding the electrode-con-necting film on the bobbin by rotating the bobbin, attaching a double-sided tape to the electrode-connecting film wound on the bobbin, and cutting the electrode-connecting film on which the double-sided tape is attached.

The method may further include, after the attaching of the double-sided tape to the electrode-connecting film, peeling a release paper from the double-sided tape.

The method may further include, after the cutting of the electrode-connecting film to which the double-sided tape is attached, fixing the end portion of the electrode-connecting film by attaching a finishing sticker to the end portion of the electrode-connecting film, which is adjacent to a portion to which the double-sided tape is attached.

According to still another aspect of the present invention, there is provided an electrode roll including a bobbin, an electrode-connecting film wound along a circumference of the bobbin, a double-sided tape attached to the wound outermost end portion of the electrode-connecting film, and an electrode connected to the double-sided tape and wound along the circumference of the bobbin on an outer side of the electrode-connecting film.

The electrode roll may include an adhesive tape for bonding the bobbin to a winding start end portion of the electrode-connecting film.

The electrode-connecting film may include one of the group consisting of polyethylene terephthalate (PET), poly-ethylene naphthalate (PEN), oriented polypropylene (OPP), polyimide (PI), polybutylene terephthalate (PBT), polyester, polyacetal, polyamide, polyethersulfone, polyphenyleneox-ide, polyphenylenesulfide, polyethylenenaphthalene, flex-ible silicone, and the like.

The adhesive tape may be an OPP tape.

Advantageous Effects

According to the present invention, electrode loss can be prevented by installing an electrode-connecting film on a bobbin and then winding an electrode on the electrode-connecting film to minimize the electrode that remains on an electrode roll and is discarded during the automatic splicing of the electrodes in a roll-to-roll process.

In addition, by replacing an electrode loss portion with an electrode-connecting film, the electrode loss can be mini-mized and quality defects can be prevented.

Further, work processes can be simplified and worker efforts can be reduced by automating pre-work previously dependent on manual work.

BRIEF DESCRIPTION OF THE DRAWINGS

FIG. 1 is a schematic view of an electrode-connecting film winding device according to one embodiment of the present invention.

FIG. 2 is a view schematically illustrating a state in which release paper is peeled from a double-sided tape by a release paper peeling unit of the electrode-connecting film winding device according to one embodiment of the present inven-tion.

FIG. 3 is a process diagram schematically illustrating a process of installing an electrode-connecting film on a bobbin.

FIG. 4 is a flowchart illustrating a method of winding the electrode-connecting film according to one embodiment of the present invention.

FIG. 5 is a schematic view of an electrode-connecting film winding device according to another embodiment of the present invention.

FIG. 6 is a process diagram schematically illustrating a process of installing an electrode-connecting film on a bobbin according to another embodiment.

FIG. 7 is a flowchart illustrating a method of winding the electrode-connecting film according to another embodiment of the present invention.

DESCRIPTION OF REFERENCE NUMERALS

1 and 1': electrode-connecting film winding device
10: bobbin installation unit
11: bobbin
13: winder
20: electrode-connecting film supply unit
21: electrode-connecting film
23: unwinder
30: transfer unit
31: base plate
31*a*: first base plate
31*b*: second base plate
33: driving roller
35: moving roller
40: adhesive tape attaching unit
41: adhesive tape
50: double-sided tape attaching unit
51: double-sided tape
51*a*: release paper
60: frame body
70: release paper peeling unit
71: gripper
80: cutting unit
90: finishing sticker attaching unit
91: finishing sticker
93: suction member

DETAILED DESCRIPTION

Some embodiments of the present invention provide an electrode-connecting film winding device including a bobbin installation unit in which a bobbin is installed, a film supply unit configured to supply an electrode-connecting film to the bobbin, a transfer unit configured to transfer the electrode-connecting film installed in the film supply unit to the bobbin installation unit, an adhesive tape attaching unit installed above the bobbin installation unit and configured to attach an end portion of the electrode-connecting film drawn out to the transfer unit to the bobbin, a double-sided tape attaching unit configured to attach a double-sided tape to the electrode-connecting film wound on the bobbin, and a frame body on which the adhesive tape attaching unit and the double-sided tape attaching unit are movably installed.

Some embodiments of the present invention also provide a method of winding an electrode-connecting film, the method including introducing and installing a bobbin, positioning an end portion of an electrode-connecting film on the bobbin, fixing the electrode-connecting film to the bobbin by attaching an adhesive tape to the end portion of the electrode-connecting film, winding the electrode-connecting film on the bobbin by rotating the bobbin, attaching a double-sided tape to the electrode-connecting film wound on the bobbin, and cutting the electrode-connecting film on which the double-sided tape is attached.

Some embodiments of the present invention also provide an electrode roll including a bobbin, an electrode-connecting film wound along a circumference of the bobbin, a double-sided tape attached to the wound outermost end portion of the electrode-connecting film, and an electrode connected to the double-sided tape and wound along the circumference of the bobbin on an outer side of the electrode-connecting film.

Hereinafter, some embodiments of the present invention will be described in detail with reference to the drawings. Prior to this, terms and words used in the present specification and claims should not be construed as limited to general or dictionary terms and should be interpreted with the meaning and concept in accordance with the technical idea of the present invention based on the principle that the inventors have appropriately defined the concepts of terms in order to explain the invention in the best way.

It is to be understood that the terms such as "including," "having," and "comprising" used throughout the specification of the present invention are intended to indicate the presence of features, numbers, operations, actions, components, parts, or combinations thereof disclosed in the specification, and are not intended to preclude the possibility of the presence or addition of one or more other features, numbers, operations, actions, components, parts, or combinations thereof.

Further, when it is stated that a portion of a layer, film, region, plate, and the like is "on" another portion, the statement includes the meaning of the portion "being directly on" the other portion in addition to still another portion being interposed therebetween. In contrast, when it is stated that a portion of a layer, film, region, plate, and the like is "below" another portion, the statement includes the meaning of the portion "being directly below" the other portion in addition to still another portion being interposed therebetween. Further, in the specification of the present invention, being disposed "on" may include not only being disposed above but also being disposed below.

First Embodiment

FIG. 1 is a schematic view of an electrode-connecting film winding device according to one embodiment of the present invention. FIG. 2 is a view schematically illustrating a state in which release paper is peeled from a double-sided tape by a release paper peeling unit of the electrode-connecting film winding device according to one embodiment of the present invention. FIG. 3 is a process diagram schematically illustrating a process of installing an electrode-connecting film on a bobbin. FIG. 4 is a flowchart illustrating a method of winding the electrode-connecting film according to one embodiment of the present invention.

As shown in FIG. 1, an electrode-connecting film winding device 1 according to one embodiment of the present invention includes a bobbin installation unit 10, an electrode-connecting film supply unit 20, a transfer unit 30, an adhesive tape attaching unit 40, a double-sided tape attaching unit 50, and a frame body 60.

The bobbin installation unit 10 is for installing an empty bobbin 11 in a state before an electrode is wound.

To this end, the bobbin installation unit 10 includes winders 13 configured to wind an electrode-connecting film 21 by rotating the empty bobbin 11, and a chucking member (not shown) configured to fix the empty bobbin 11 installed in the winders 13.

The winders 13 are coupled to both end portions of the bobbin 11 and rotate the bobbin 11. The chucking member may hold an edge of the bobbin 11 coupled to the winders 13 to fix the empty bobbin 11 to the winders 13.

Since the winder 13 for rotating the bobbin 11 and the chucking member for fixing the bobbin 11 to the winder 13 are known configurations, detailed descriptions thereof will be omitted.

The electrode-connecting film supply unit 20 is disposed adjacent to the bobbin installation unit 10 and supplies the electrode-connecting film 21 to the bobbin 11.

To this end, an unwinder 23 for installing the electrode-connecting film 21 in the form of a roll is provided in the electrode-connecting film supply unit 20, and the unwinder 23 may be formed in a cantilever structure.

The unwinder 23 may be partially fixed to prevent the electrode-connecting film 21 from sagging due to the weight of the electrode-connecting film 21.

The electrode-connecting film 21 installed on the unwinder 23 is supplied to the bobbin 11 of the bobbin installation unit 10.

By the structure as described above, when the electrode-connecting film supply unit 20 supplies the electrode-connecting film 21 to the bobbin installation unit 10, the bobbin 11 is rotated by the operation of the winder 13 to wind the electrode-connecting film 21 on the empty bobbin 11.

The transfer unit 30 transfers the electrode-connecting film 21 installed in the electrode-connecting film supply unit 20 to the bobbin installation unit 10. That is, the transfer unit 30 serves to transfer the electrode-connecting film 21 supplied from the electrode-connecting film supply unit 20 to the bobbin 11 of the bobbin installation unit 10.

As shown in FIG. 2, the transfer unit 30 includes a base plate 31, a driving roller 33 that rotates to transfer the electrode-connecting film 21, and a moving roller 35.

The base plate 31 may be formed in the shape of a flat plate, and may be provided as one or more base plates. The base plate 31, in addition to supporting the electrode-connecting film drawn from the electrode-connecting film supply unit 20, serves as a support structure when attaching a tape to the electrode-connecting film 21 or cutting.

The base plate 31 may include a first base plate 31*a* disposed adjacent to the electrode-connecting film supply unit 20 and a second base plate 31*b* disposed adjacent to the bobbin 11.

At least one driving roller 33 is provided adjacent to the base plate 31, and the electrode-connecting film is transferred toward the bobbin installation unit 10 by the rotation of the driving roller 33 while being supported by the base plate 31.

The moving roller 35 is for constantly maintaining the tension of the electrode-connecting film 21 drawn from the electrode-connecting film supply unit 20, and is movably installed such that a position thereof is adjusted in response to the tension acting on the electrode-connecting film 21 while rotating so that the electrode-connecting film 21 is transferred toward the bobbin installation unit 10.

The moving roller 35 may maintain the tension during cutting, taping, and finishing of the electrode-connecting film 21 drawn from the electrode-connecting film supply unit 20. When the electrode-connecting film 21 transferred by the driving of the driving roller 33 is cut, taped, and finished on the base plate 31, the process may be performed in a state in which the moving roller 35 moves to maintain the tension.

The adhesive tape attaching unit 40 is installed above the bobbin installation unit 10. Preferably, the adhesive tape attaching unit 40 is installed above the bobbin installation unit 10 to be vertically movable. The adhesive tape attaching unit 40 attaches an end portion of the electrode-connecting film 21 to the bobbin 11.

An adhesive tape 41 in the form of a roll is installed in the adhesive tape attaching unit 40, and the installed adhesive tape 41 is supplied to the bobbin 11.

The adhesive tape attaching unit 40 is installed to be horizontally movable in a width direction of the bobbin 11. Thus, the adhesive tape attaching unit 40 attaches the adhesive tape to the end portion of the electrode-connecting film 21 while moving in the width direction of the bobbin 11. Accordingly, the electrode-connecting film 21 is fixed on the bobbin due to the adhesive tape.

Specifically, the adhesive tape attaching unit 40 descends toward the bobbin 11 installed in the bobbin installation unit 10, and attaches the adhesive tape 41 so that the adhesive tape 41 covers the bobbin 11 and the end portion of the electrode-connecting film 21. First, the adhesive tape attaching unit 40 attaches the adhesive tape 41 to one side of the bobbin in the width direction, and then moves horizontally toward the other side of the bobbin 11 in the width direction to attach the adhesive tape 41 to the other side of the bobbin in the width direction, thereby fixing the electrode-connecting film 21 on the bobbin 11.

After attaching the adhesive tape 41 along the width direction of the bobbin, the adhesive tape attaching unit 40 returns to its initial position. This process is repeated for the next empty bobbin 11, which is newly installed in the bobbin installation unit 10, in the same manner.

When the electrode-connecting film 21 is fixed on the bobbin 11, the winder 13 rotates the bobbin a predetermined number of times to wind as much as a predetermined length of the electrode-connecting film 21 on the bobbin 11.

The double-sided tape attaching unit 50 is disposed adjacent to an upper portion of the transfer unit 30 to attach a double-sided tape 51 to the electrode-connecting film 21 wound on the bobbin 11.

To this end, the double-sided tape attaching unit 50 may be provided above the transfer unit 30 to be vertically movable, and attaches the double-sided tape 51 to the electrode-connecting film 21 transferred by the transfer unit 30.

In the double-sided tape attaching unit 50, the double-sided tape 51 having adhesive surfaces on both sides is installed in the form of a roll.

The double-sided tape attaching unit 50 descends toward the electrode-connecting film 21, which is drawn from the electrode-connecting film supply unit 20 and transferred through the transfer unit 30. The lowered double-sided tape attaching unit 50 attaches the double-sided tape 51 to the electrode-connecting film 21 and then rises again. This process is repeated for the next empty bobbin 11, which is newly installed in the bobbin installation unit 10, in the same manner.

In the embodiment of the present invention, the double-sided tape attaching unit 50 is provided to be vertically movable, but the double-sided tape attaching unit 50 may also be installed to be horizontally movable in a width direction of the electrode-connecting film 21. In this case, the double-sided tape attaching unit 50 may attach the double-sided tape 51 to the electrode-connecting film 21 while moving in the width direction. In addition, various other design changes are possible, such as the double-sided tape attaching unit 50 moving in a vertical direction and a horizontal direction.

Meanwhile, the electrode-connecting film winding device 1 according to one embodiment of the present invention may further include a release paper peeling unit 70. The release paper peeling unit 70 may be disposed adjacent to the double-sided tape attaching unit 50 and may peel a release paper 51a from the double-sided tape 51 attached to the electrode-connecting film 21.

To this end, the release paper peeling unit 70 may include a gripper 71 for gripping the release paper 51a.

The double-sided tape 51 may be attached to the electrode-connecting film 21, on the second base plate 31b of the transfer unit 30, wherein the electrode-connecting film 21 is drawn out to the transfer unit 30 through the double-sided tape attaching unit 50. In addition, the electrode-connecting film 21 to which the double-sided tape 51 is attached continuously moves by rotation of each driving roller 33, and the release paper 51a attached to the double-sided tape 51 is removed through the release paper peeling unit 70.

That is, as shown in FIG. 2, after the double-sided tape 51 is attached to the electrode-connecting film 21, the moving roller 35 provided adjacent to the first base plate 31a moves in a diagonal direction toward a lower portion of the first base plate 31a, and at this time, the gripper 71 provided at a front end of the release paper peeling unit 70 may grip the release paper Ma and then peel the release paper Ma from the double-sided tape 51. After peeling off the release paper 51a, the moving roller 35 may be moved back in the diagonal direction to return to its original position.

According to one embodiment of the present invention, the release paper peeling unit 70 includes the gripper 71, but it is also possible that a suction unit (not shown) is provided in the release paper peeling unit 70 to peel the release paper 51a from the double-sided tape 51 using a suction force.

The electrode-connecting film winding device 1 according to one embodiment of the present invention further includes a cutting unit 80 for cutting the electrode-connecting film 21. The cutting unit 80 may be connected to the adhesive tape attaching unit 40. The cutting unit 80 cuts the electrode-connecting film 21 to which the double-sided tape 51 is attached to an appropriate length.

As described above, the electrode-connecting film 21, to which the double-sided tape 51 is attached, on the bobbin 11 is cut by the cutting unit 80.

Meanwhile, the adhesive tape attaching unit 40 according to the present embodiment may be installed to be movable forward and backward with respect to a traveling direction of the electrode-connecting film 21 wound on the bobbin 11 as well as in the width direction of the bobbin 11.

For example, after the adhesive tape attaching unit 40 moves forward and backward with respect to the traveling direction of the electrode-connecting film 21, the cutting unit 80 connected to the adhesive tape attaching unit 40 may cut the wound electrode-connecting film 21 a predetermined number of times.

To this end, the electrode-connecting film winding device 1 according to some embodiments of the present invention may include the electrode-connecting film supply unit 20, the transfer unit 30, the adhesive tape attaching unit 40, and a control unit (not shown) for controlling operations of the double-sided tape attaching unit 50.

The frame body 60 may be provided above the bobbin installation unit 10. The adhesive tape attaching unit 40 and the double-sided tape attaching unit 50 may be movably installed on the frame body 60. For example, the adhesive tape attaching unit 40 and the double-sided tape attaching unit 50 may be installed to be horizontally movable, able to descend/ascend (vertically movable), or both horizontally and vertically movable along the frame body 60.

By installing the adhesive tape attaching unit 40 and the double-sided tape attaching unit 50 together on the frame body 60, when the electrode-connecting film 21 is supplied to the bobbin 11, the adhesive tape attaching unit 40 installed on the frame body 60 may descend to attach the end portion of the electrode-connecting film 21 supplied to the bobbin 11, and subsequently, the double-sided tape attaching unit 50 may descend toward the transfer unit 30 to attach the double-sided tape 51 to the electrode-connecting film 21.

The adhesive tape attaching unit 40 and the double-sided tape attaching unit 50 installed on the frame body 60 may be implemented to be movable by a known rail structure, and thus, detailed descriptions thereof will be omitted.

At this time, the adhesive tape attaching unit 40 installed on the frame body 60 may be configured to be able to ascend/descend in longitudinal and width directions of the electrode-connecting film 21 and the vertical direction. The double-sided tape attaching unit 50 may be configured to be able to ascend/descend in the vertical direction.

In addition, the release paper peeling unit 70 may also be installed on the frame body 60.

Hereinafter, a method of winding the electrode-connecting film according to one embodiment of the present invention will be described with reference to FIGS. 3 and 4.

First, the empty bobbin 11 is introduced and installed (S10). That is, the bobbin 11 in a state before an electrode is wound is introduced into the bobbin installation unit 10 and installed in the winder 13.

In addition, the bobbin 11 is fixed to the winder 13 by coupling the chucking member to the bobbin 11 installed in the winder 13.

After installing the bobbin 11 in the bobbin installation unit 10, the electrode-connecting film supply unit 20 is driven to supply the electrode-connecting film 21 installed on the unwinder 23 to the bobbin 11.

The electrode-connecting film 21 is transferred to the bobbin installation unit 10 through the transfer unit 30. The electrode-connecting film 21 is transferred to the bobbin installation unit 10 by rotation of each driving roller 33 of the transfer unit 30, while being supported on the first base plate 31a and the second base plate 31b. At this time, the electrode-connecting film 21 is transferred while the tension of the electrode-connecting film 21 is adjusted by the movement of the moving roller 35.

An end portion of the electrode-connecting film 21 transferred through the transfer unit 30 is positioned on the empty bobbin 11 installed in the bobbin installation unit 10 (S20).

In addition, the adhesive tape 41 is attached to the end portion of the electrode-connecting film 21 to fix the electrode-connecting film 21 to the empty bobbin 11 (S30).

That is, the end portion of the electrode-connecting film 21 is positioned on the bobbin 11, and then the adhesive tape attaching unit 40 descends toward the bobbin 11. The lowered adhesive tape attaching unit 40 first attaches a portion of the electrode-connecting film 21 on the bobbin 11. Thereafter, the adhesive tape attaching unit 40 horizontally moves to attach the remaining portion of the electrode-connecting film 21 to the bobbin 11, thereby attaching the electrode-connecting film 21 to the bobbin 11 with the adhesive tape 41.

After fixing the electrode-connecting film 21 to the bobbin 11 with the adhesive tape 41, the winder 13 is rotated to wind the electrode-connecting film 21 multiple times on the bobbin 11 (S40).

When an old roll and a new roll are automatically bonded (spliced), the discarded and lost electrode wound on the old roll is approximately 10 m to 15 m, and thus, the electrode-connecting film 21 being wound on the bobbin 11 is preferably wound multiple times so that it is wound by about 10 m to 20 m, but some embodiments of the present invention are not limited thereto.

Next, the double-sided tape 51 is attached to the electrode-connecting film 21 wound on the bobbin 11 (S50).

That is, after winding the electrode-connecting film 21 on the bobbin 11, the double-sided tape attaching unit 50 provided above the first base plate 31a of the transfer unit 30 descends to attach the double-sided tape 51 to the electrode-connecting film 21 on the first base plate 31a.

After attaching the double-sided tape 51 to the electrode-connecting film 21, the release paper 51a is peeled from the double-sided tape 51 by the release paper peeling unit 70 disposed adjacent to a traveling direction of the double-sided tape attaching unit 50 (S60).

Here, the moving roller 35 adjacent to the first base plate 31a moves in the diagonal direction toward a lower portion of the first base plate 31a, and the gripper 71 provided at a front end of the release paper peeling unit 70 grips the release paper 51a and peels the release paper 51a from the double-sided tape 51.

The electrode-connecting film 21 from which the release paper Ma is peeled is moved downward in the diagonal direction along the moving roller 35 and then transferred to the bobbin installation unit 10 while being supported by the second base plate 31b.

Then, the electrode-connecting film 21, to which the double-sided tape 51 is attached and which is transferred to the bobbin installation unit 10, is cut (S70).

That is, the electrode-connecting film 21 from which the release paper 51a is peeled by the release paper peeling unit 70 is continuously transferred toward the bobbin installation unit 10, and the double-sided tape 51 attached to the electrode-connecting film 21 is positioned below the cutting unit 80 provided above the bobbin installation unit 10. The cutting unit 80 descends and cuts a portion of the electrode-connecting film 21, which is adjacent to a portion to which the double-sided tape 51 is attached, through a cutter unit (not shown).

The electrode-connecting film 21 cut by the cutting unit 80 is wound on the bobbin 11. The bobbin 11 on which the electrode-connecting film 21 is wound is unloaded and then moved to a post-process for winding the electrode to manufacture a jumbo roll. The double-sided tape is positioned at the outermost end portion of the electrode-connecting film wound on the bobbin. When the electrode having a predetermined length is attached to an adhesive surface of the double-sided tape from which the release paper is peeled and the electrode is rewound again, an electrode roll is completed.

As described above, the double-sided tape 51 attached to the electrode-connecting film 21 is for attaching the end portion of the electrode when the electrode roll is manufactured by winding the electrode. When the end portion of the electrode is attached to the double-sided tape 51 and the electrode is wound, the electrode may be used up to the end portion of the electrode when bonding the electrodes of the old and new rolls in a roll-to-roll process, thereby minimizing electrode loss.

Second Embodiment

Figure 5:
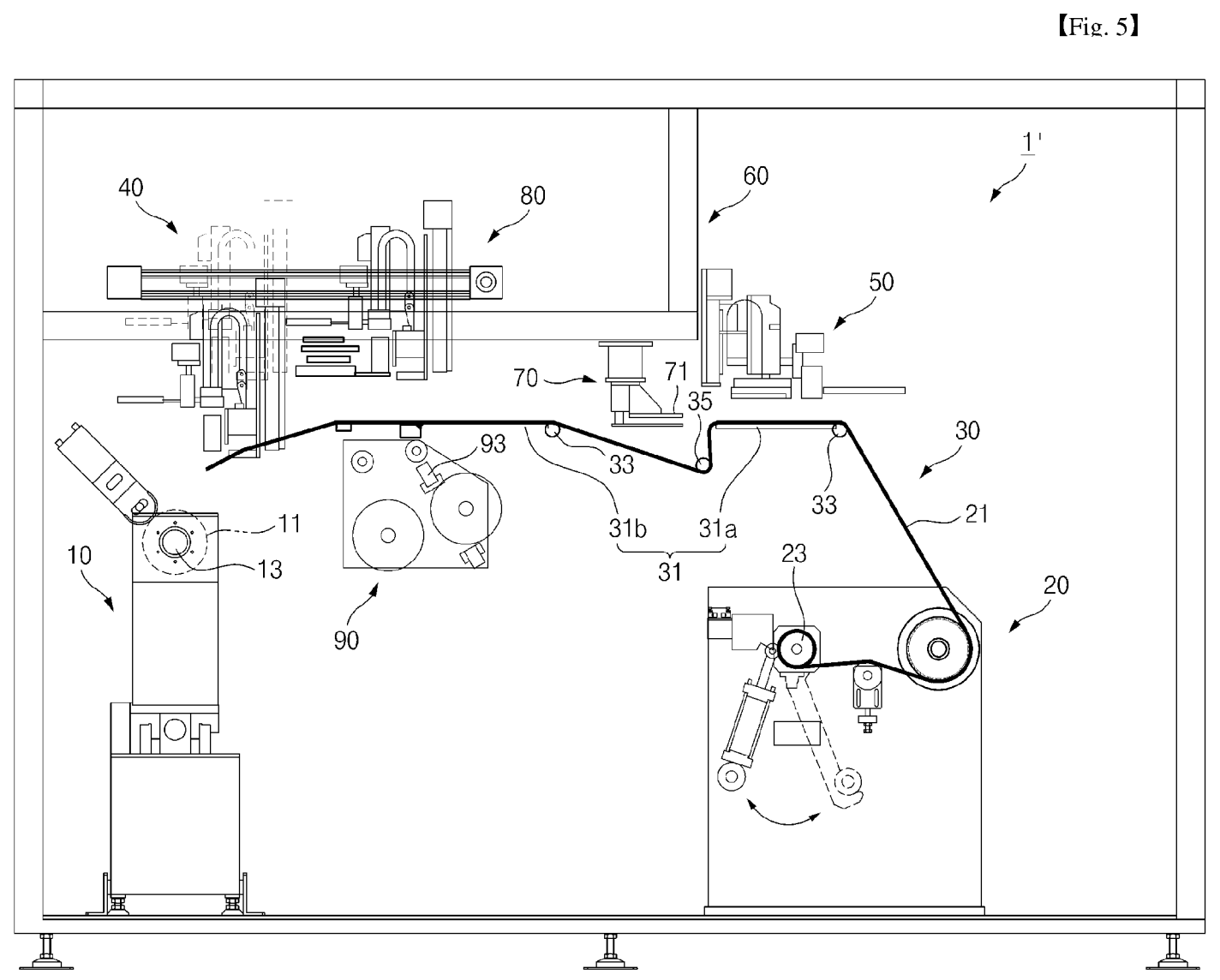

FIG. 5 is a schematic view of an electrode-connecting film winding device according to another embodiment of the present invention. FIG. 6 is a process diagram schematically illustrating a process of installing an electrode-connecting film on a bobbin according to another embodiment. FIG. 7 is a flowchart illustrating a method of winding the electrode-connecting film according to another embodiment of the present invention.

As shown in FIG. 5, an electrode-connecting film winding device 1' according to the present embodiment further includes a finishing sticker attaching unit 90.

That is, the finishing sticker attaching unit 90 is for fixing an electrode-connecting film 21 by attaching a finishing sticker 91 to a cut end portion of the electrode-connecting film 21 to prevent the end portion of the electrode-connecting film 21 cut by a cutting unit 80 from fluttering.

Here, the finishing sticker attaching unit 90 is provided below the cutting unit 80, and is provided below a second base plate 31b of a transfer unit 30 to fix the electrode-connecting film 21 by attaching the finishing sticker 91 to the cut end portion of the electrode-connecting film 21 wound on a bobbin 11.

At this time, the finishing sticker attaching unit 90 is formed such that a suction member 93 is provided in the finishing sticker attaching unit 90 to suction the cut end portion of the electrode-connecting film 21 being transferred and then attach the finishing sticker 91.

As shown in FIGS. 5 and 6, the cut end portion of the electrode-connecting film 21 cut by the cutting unit 80 is suctioned by the suction member 93, and the finishing sticker 91 is attached to the suctioned end portion of the electrode-connecting film 21.

Here, about ½ of an adhesive surface of the finishing sticker 91 is attached to a lower surface of the cut end portion of the electrode-connecting film 21 passing over a first base plate 31a. Thereafter, the electrode-connecting film 21 continuously transferred to a bobbin installation unit 10 is wound on the bobbin while being rotated along a rotation direction of the bobbin 11. The remaining ½ of the adhesive surface of the finishing sticker 91 is attached to a surface of a portion of the electrode-connecting film facing or overlapping the wound end portion of the electrode-connecting film 21, thereby fixing the cut end portion of the electrode-connecting film 21.

Accordingly, unwinding of the electrode-connecting film 21 wound on the empty bobbin 11 may be prevented. In addition, even when the bobbin moves to a post-process, the unwinding of the electrode-connecting film 21 wound on the bobbin 11 may be prevented.

The finishing sticker attaching unit 90 may move in a width direction of the bobbin 11. The finishing sticker attaching unit 90 may attach the finishing sticker 91 to the cut end portion of the electrode-connecting film 21 and each of a plurality of points of the electrode-connecting film 21 wound on the bobbin 11 while moving in a width direction of the electrode-connecting film 21.

As shown in FIGS. 6 and 7, a method of winding the electrode-connecting film on the empty bobbin for improving electrode loss according to the present embodiment further includes, after cutting the electrode-connecting film 21 to which the double-sided tape 51 is attached, attaching the finishing sticker 91 to the end portion of the electrode-connecting film 21, which is adjacent to a portion to which a double-sided tape 51 is attached, to fix the end portion of the electrode-connecting film 21 and the electrode-connecting film 21 wound on the bobbin 11 (S80).

As described above, by attaching the finishing sticker 91 to the end portion of the electrode-connecting film 21 by the finishing sticker attaching unit 90, the cut end portion of the electrode-connecting film 21 may be prevented from fluttering. In addition, the electrode-connecting film 21 may be maintained in a fixed state when the bobbin 11 to which the electrode-connecting film 21 is attached is moved to a post-process for winding the electrode.

According to the electrode-connecting film winding device and winding method of some embodiments of the present invention, the following electrode roll may be manufactured.

According to some embodiments of the present invention, instead of an electrode roll in which an end portion of an electrode is directly connected to a bobbin as in the related art, an electrode roll in which an electrode-connecting film is first connected to a bobbin and an electrode is connected to the electrode-connecting film and wound may be manufactured. That is, as shown in FIG. 3, an electrode roll according to another embodiment of the present invention includes a bobbin 11, an electrode-connecting film 21 wound along a circumference of the bobbin, a double-sided tape 51 attached to the wound outermost end portion of the electrode-connecting film, and an electrode (not shown) connected to the double-sided tape and wound along the circumference of the bobbin on an outer side of the electrode-connecting film.

The electrode roll may include an adhesive tape for bonding the bobbin to a winding start end portion of the electrode-connecting film. That is, by directly bonding the winding start end portion of the electrode-connecting film on the bobbin with the adhesive tape, the winding start end portion of the electrode-connecting film can be fixed on the bobbin.

The electrode-connecting film 21 may employ a film made of a flexible material capable of absorbing tension to relieve stress. When the film made of such a material is connected to the electrode, a problem of damage to the connected portion due to local tension concentration may be prevented. Examples of such a film include polyethylene terephthalate (PET), polyethylene naphthalate (PEN), oriented polypropylene (OPP), polyimide (PI), polybutylene terephthalate (PBT), polyester, polyacetal, polyamide, polyethersulfone, polyphenyleneoxide, polyphenylenesulfide, polyethylenenaphthalene, flexible silicone, and the like.

A thickness of the electrode-connecting film 21 may be determined in consideration of a material and physical properties.

The adhesive tape may be an OPP tape. However, the adhesive tape is not limited thereto, and any tape known in the art may be used as the adhesive tape. For example, a tape coated with a predetermined adhesive such as an acrylic-based adhesive applied to film paper such as paper or synthetic resin may be used as the adhesive tape.

The electrode-connecting film is positioned at a winding start portion of the electrode roll of some embodiments of the present invention, which is wound on the bobbin, and the electrode is wound on the outer periphery of the electrode-connecting film. Accordingly, when electrodes of old and new rolls are spliced and the electrode of the old roll is cut, the electrode of the old roll may be used to the end portion. That is, when the end portion of the electrode spliced to the electrode-connecting film of the old roll is bonded to the electrode of the new roll and cut, there is almost no electrode portion discarded in the old roll. Conventionally, since the electrode is wound on the bobbin from a starting end portion, when splicing the electrodes, there is inevitably a portion of the electrode that is discarded from the old roll.

In addition, the old roll with the cut electrode may be subsequently spliced with the remaining electrode-connecting film to manufacture a new electrode roll. As described above, the electrode roll of some embodiments of the present invention has a structure capable of preventing electrode loss and easily manufacturing a new electrode roll by using the electrode-connecting film, and thus has excellent economic performance and low manufacturing costs.

Although the invention is shown and described in connection with particular embodiments, it will be readily apparent to those of ordinary skill in the art that various modifications and variations are possible without departing from the spirit and scope of the invention shown in the appended claims.

The invention claimed is:

1. An electrode-connecting film winding device comprising:
   a bobbin installation unit configured to install a bobbin;
   a film supply unit configured to supply an electrode-connecting film to the bobbin;
   a transfer unit configured to transfer the electrode-connecting film installed in the film supply unit to the bobbin installation unit;
   an adhesive tape attaching unit installed above the bobbin installation unit and configured to attach an end portion of the electrode-connecting film to the bobbin;
   a double-sided tape attaching unit configured to attach a double-sided tape to the electrode-connecting film wound on the bobbin; and
   a frame body having the adhesive tape attaching unit and the double-sided tape attaching unit installed, wherein the adhesive tape attaching unit and the double-sided tape attaching unit are moveable with respect to the frame body.

2. The electrode-connecting film winding device of claim 1,
   wherein the bobbin installation unit includes a winder and a chucking member, wherein the winder is configured to wind the electrode-connecting film by rotating the bobbin and the chucking member is configured to fix the bobbin in the winder.

3. The electrode-connecting film winding device of claim 1,
   wherein the adhesive tape attaching unit is configured to move in a width direction of the bobbin, and
   wherein the adhesive tape attaching unit is configured to fix the electrode-connecting film on the bobbin by attaching an adhesive tape to the end portion of the electrode-connecting film while moving in the width direction of the bobbin.

4. The electrode-connecting film winding device of claim 3, further comprising a cutting unit communicating with the adhesive tape attaching unit,
   wherein the cutting unit is configured to cut the electrode-connecting film to which the double-sided tape is attached by the double-sided tape attaching unit.

5. The electrode-connecting film winding device of claim 4, further comprising a finishing sticker attaching unit disposed below the cutting unit,
   wherein the finishing sticker attaching unit is configured to fix the electrode-connecting film by attaching a finishing sticker to a cut end portion of the electrode-connecting film.

6. The electrode-connecting film winding device of claim 1, wherein the double-sided tape attaching unit is installed above the transfer unit, wherein the double-sided tape attaching unit is configured to move in a vertical direction.

7. The electrode-connecting film winding device of claim 1, further comprising a release paper peeling unit configured to peel a release paper from the double-sided tape attached to the electrode-connecting film.

8. The electrode-connecting film winding device of claim 1, wherein the transfer unit includes:

at least one base plate configured to support the electrode-connecting film being transferred, at least one driving roller configured to transfer the electrode-connecting film, and a moving roller movably installed configured to maintain a tension in the electrode-connecting film being transferred, wherein the moving roller is moveable.

9. A method of winding an electrode-connecting film, the method comprising:

installing a bobbin;

contacting an end portion of an electrode-connecting film with the bobbin;

fixing the electrode-connecting film to the bobbin by attaching an adhesive tape to the end portion of the electrode-connecting film;

winding the electrode-connecting film on the bobbin by rotating the bobbin;

attaching a double-sided tape to the electrode-connecting film wound on the bobbin; and cutting the electrode-connecting film on which the double-sided tape is attached.

10. The method of claim 9, further comprising, after the attaching of the double-sided tape to the electrode-connecting film, peeling a release paper from the double-sided tape.

11. The method of claim 9, further comprising, after the cutting of the electrode-connecting film to which the double-sided tape is attached, fixing the end portion of the electrode-connecting film by attaching a finishing sticker to the end portion of the electrode-connecting film, wherein the end portion of the electrode-connecting film is adjacent to a portion of the electrode connecting film to which the double-sided tape is attached.

12. An electrode roll comprising:

a bobbin;

an electrode-connecting film wound along a circumference of the bobbin in a wound state;

a double-sided tape attached to an outermost end portion of the electrode-connecting film in the wound state; and an electrode communicating with the double-sided tape, the electrode in the wound state along the circumference of the bobbin along an exterior side of the electrode-connecting film.

13. The electrode roll of claim 12, comprising an adhesive tape configured to bond the bobbin to a winding start end portion of the electrode-connecting film.

14. The electrode roll of claim 12, wherein the electrode-connecting film includes one or more of polyethylene terephthalate (PET), polyethylene naphthalate (PEN), oriented polypropylene (OPP), polyimide (PI), polybutylene terephthalate (PBT), polyester, polyacetal, polyamide, polyethersulfone, polyphenyleneoxide, polyphenylenesulfide, polyethylenenaphthalene, or flexible silicone.

15. The electrode roll of claim 13, wherein the adhesive tape is an oriented polypropylene (OPP) tape.

\* \* \* \* \*